United States Patent [19]

Stude

[11] Patent Number: 4,718,189

[45] Date of Patent: Jan. 12, 1988

[54] FISHING SPEAR TIP

[76] Inventor: Rodney C. Stude, 8163 E. Mineral Dr., Englewood, Colo. 80110

[21] Appl. No.: 44,815

[22] Filed: Apr. 29, 1987

[51] Int. Cl.$^4$ .............................................. A01K 81/04
[52] U.S. Cl. ............................................. 43/6; 294/61
[58] Field of Search ........................... 43/6, 5; 294/61; 273/419

[56] References Cited

U.S. PATENT DOCUMENTS

| | | | |
|---|---|---|---|
| D. 211,637 | 7/1968 | McKusick | 43/6 |
| 3,486,265 | 12/1969 | Cheesebrew | 43/6 |
| 3,602,542 | 8/1971 | Disston | 294/61 |
| 4,052,808 | 10/1977 | Crabtree | 43/6 |
| 4,272,905 | 6/1981 | Hinkle | 43/6 |
| 4,429,480 | 2/1984 | Stude | 43/6 |

Primary Examiner—Gene P. Crosby
Attorney, Agent, or Firm—William P. O'Meara; Bruce G. Klaas

[57] ABSTRACT

A fishing spear tip for mounting on a fishing spear shaft has a first, second, and third spear prong mounted in a prong holder having a central longitudinally extending straight bore extending rearwardly from the forward end thereof and adapted to receive the proximal end portions of the first, second, and third prongs therein. An adapter is operatively associated with the prong holder for attaching the prong holder to a spear shaft. Matrix material is positioned in the straight bore in the prong holder in fixed bonding relationship therewith and in fixedly holding, engaging contact with proximal end portions of the first, second, and third prongs. The central longitudinal axes of the first, second, and third prongs, and the central longitudinal axis of the prong holder all are positioned in nonparallel, nonintersecting relationship.

9 Claims, 4 Drawing Figures

U.S. Patent    Jan. 12, 1988    4,718,189
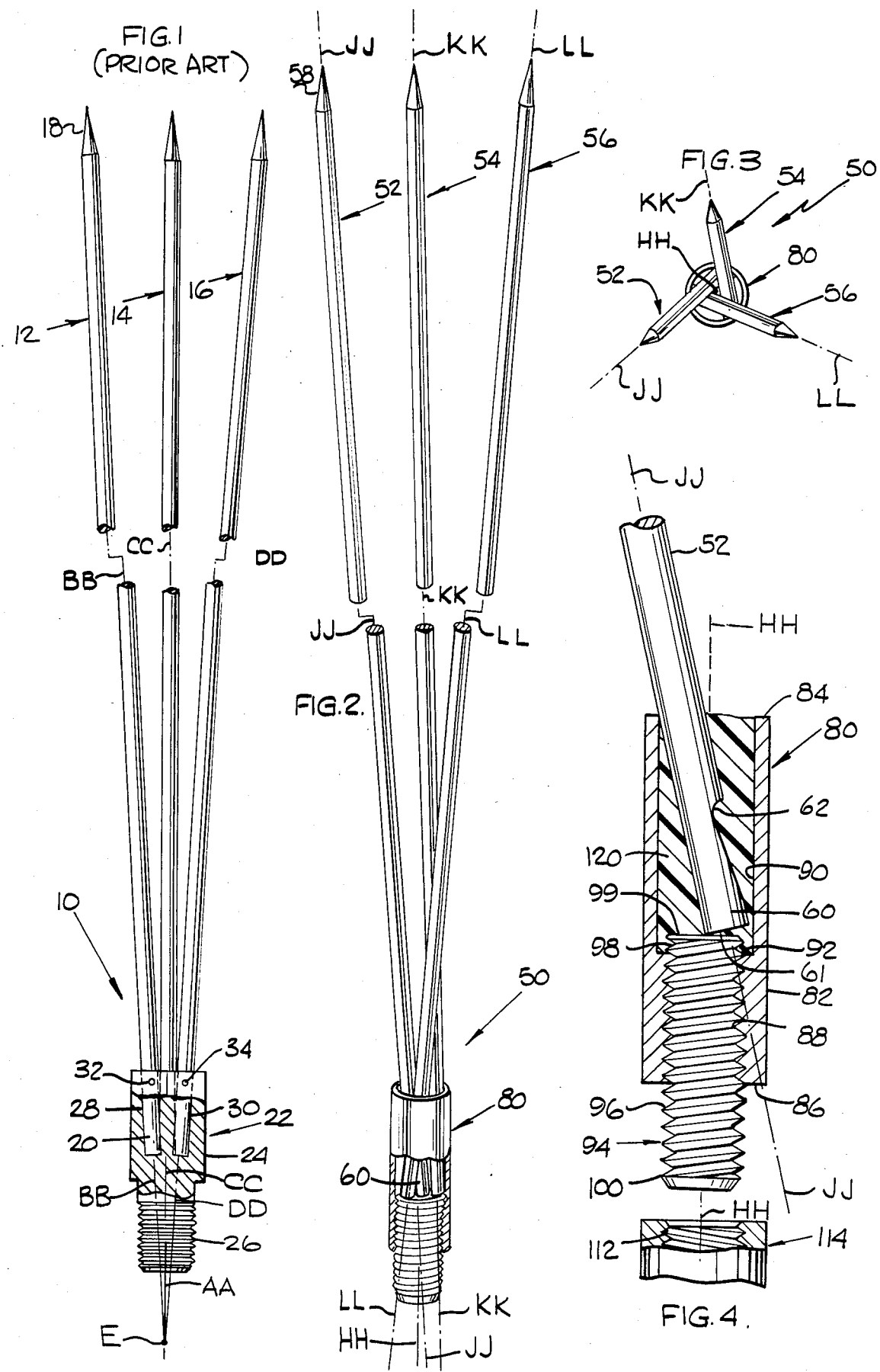

FISHING SPEAR TIP

BACKGROUND OF THE INVENTION

The present invention relates generally to hand-held fishing spears and, more particularly, to a spear tip for hand-held fishing spears.

Sling-type hand-held fishing spears, for which the spear tip of the present invention is especially adapted, have been in use for many years. Examples of such prior art sling spears are shown in my U.S. Pat. No. 4,429,480 and my pending U.S. patent application Ser. No. 885,288, which discloses a method of attaching a rubber sling through use of a fastener mounted in polyester resin. U.S. Pat. No. 4,429,480 and application Ser. No. 885,288 are hereby incorporated by reference for all that is contained therein. Spear tips for such hand-held spears are provided in a variety of different forms. One popular prior art spear tip includes a single pointed metal shaft which is adapted to pierce through the body of a fish. A small wing-shaped device is journaled to the spear tip near the forward end thereof and is constructed and arranged such that the wing is positioned in close-fitting parallel relationship with the spear tip shaft as the spear tip penetrates through a fish and such that the wing extends transversely outwardly from the shaft subsequent to striking the target to prevent the fish from sliding off the spear tip. However, a problem with such a spear tip is that, subsequent to being struck by the spear, a fish will continue to struggle, resulting in further damage to the fish and, occasionally, in loss of the fish from the spear tip. Another popular spear tip which overcomes many of these problems is generally referred to in the art as a "paralyzer" spear tip. A paralyzer spear tip has three elongate prongs projecting outwardly in an arrangement similar to the legs of a tripod. It has been found that a paralyzer spear tip traumatizes a speared fish in a manner which substantially prevents further struggling and damage to the fish. One drawback of prior art paralyzer spear tips has been that such tips are rather expensive to construct. Another drawback has been that such tips are rather heavy and require a relatively large profile adapter portion due to machining requirements.

It is an object of the present invention to provide a paralyzer-type spear tip which overcomes these problems of the prior art.

SUMMARY OF THE INVENTION

The invention may comprise a fishing spear tip for mounting on a fishing spear shaft comprising: (a) a first spear prong having a first prong central longitudinal axis, and having a proximal end portion and having a pointed distal end adapted for penetrating a target; (b) a second spear prong substantially identical in construction to said first spear prong; (c) a third spear prong substantially identical in construction to said first spear prong; (d) a prong holder having a central longitudinal axis and having a forward end portion adapted to be positioned distal the spear shaft and a rear end portion adapted to be positioned proximal the spear shaft; said prong holder having a central longitudinally extending straight bore extending rearwardly from said forward end thereof and adapted to receive said proximal end portions of said first, second, and third prongs therein; (e) adapter means operatively associated with said prong holder for attaching said prong holder to a spear shaft; (f) matrix material positioned in said straight bore in said prong holder in fixed bonding relationship therewith and in fixedly holding, engaging contact with said proximal end portions of said first, second, and third prongs; (g) said central longitudinal axes of said first, second, and third prongs, and said central longitudinal axis of said prong holder all being positioned in nonparallel, nonintersecting relationship; terminal end portions of said distal end portions of said prongs being positioned in approximately equally spaced relationship and approximately equally distant from said central longitudinal axis of said prong holder and being substantially positioned in a plane perpendicular to said central longitudinal axis of said prong holder.

The invention may also comprise a fishing spear tip for mounting on a fishing spear shaft comprising: a first spear prong having a first prong central longitudinal axis, and having a proximal end portion having a notch therein adapted to prevent longitudinal or rotational movement of said first prong within a surrounding matrix, and having a pointed distal end adapted for penetrating a target, said first prong being generally cylindrical in shape and having a diameter of approximately 3/16 inch and having a length of approximately 11.8 inches; a second spear prong substantially identical in construction to said first spear prong; a third spear prong substantially identical in construction to said first spear prong; a prong holder having a central longitudinal axis and having a forward end portion adapted to be positioned distal the spear shaft and a rear end portion adapted to be positioned proximal the spear shaft; said prong holder having a central longitudinally extending straight bore extending rearwardly from said forward end thereof and adapted to receive said proximal end portions of said first, second, and third prongs therein; said prong holder having a central longitudinally extending threaded bore, interfacing with said straight bore and extending rearwardly therefrom, said threaded bore having a smaller diameter than said straight bore, said straight bore terminating at a central opening at a terminal end of said forward end portion of said prong holder, said threaded bore terminating at a central opening at a terminal end of said rear end portion of said prong holder; said prong holder being generally cylindrical in shape and having a diameter of approximately 0.5 inch and a length of approximately 1.6 inches; said straight bore having a length of approximately 1.0 inch and a diameter of approximately 0.4 inch; said threaded bore having a diameter of approximately ⅜ inch; said prong holder being constructed from anodized aluminum; a male adapter screw having threads thereon adapted to be screwingly received in said threaded bore of said prong holder; said male adapter screw having a length of approximately 1.0 inch; said male adapter being screwingly received in said said threaded bore at a position whereat a forward portion of said male adapter screw projects approximately 1.0 inch into said straight bore; matrix material positioned in said straight bore in said prong holder in fixed bonding relationship therewith and in fixedly holding, engaging contact with said proximal end portions of said first, second, and third prongs and said forwardly projecting portion of said male adapter screw; said matrix material comprising a mixture of hard-setting matrix material and flexible matrix material; said first, second, and third prongs being positioned with terminal end portions of said proximal end portions thereof in engaging contact with said male adapter screw and with cylindrical sidewall surfaces thereof in engaging contact with a sidewall portion of said prong holder straight bore; said central longitudinal axes of said first, second, and third prongs, and said central longitudinal axis of said prong holder all being positioned in nonparallel, nonintersecting relationship; terminal end portions of said distal end portions of said prong being positioned in approximately equally spaced relationship and approximately equally distant from said central longitudinal axis of said prong holder and being substantially positioned in a plane perpendicular to said central longitudinal axis of said prong holder; said rear end portion of said male adapter screw being adapted to be screwingly received in a female adapter portion provided at a forward end of a spear shaft.

The invention may also comprise: a method of making a paralyzer spear tip comprising the steps of: (a) providing a first spear prong having a first prong central longitudinal axis, and having a proximal end portion and having a pointed distal end adapted for penetrating a target; a second spear prong substantially identical in construction to said first spear prong; a third spear prong substantially identical in construction to said first spear prong; a prong holder having a central longitudinal axis and having a forward end portion adapted to be positioned distal the spear shaft and a rear end portion adapted to be positioned proximal the spear shaft; said prong holder having a central longitudinally extending straight bore extending rearwardly from said forward end thereof and adapted to receive said proximal end portions of said first, second, and third prongs therein; (b) positioning the prong holder is a vertical orientation with the straight bore opening positioned upwardly; (c) filling the straight bore in the prong holder with a relatively firm setting matrix material; (d) positioning the proximal ends of said first, second, and third spear prongs in said prong holder straight bore; (e) simultaneously urging the distal tips of the three prongs outwardly with approximately equal force.

BRIEF DESCRIPTION OF THE DRAWING

An illustrative and presently preferred embodiment of the invention is shown in the accompanying drawing in which:

FIG. 1 is a partially cut-away side elevation view of a prior art spear tip.

FIG. 2 is a partially cut-away perspective view of a spear tip of the present invention.

FIG. 3 is a top view of the spear tip of FIG. 2.

FIG. 4 is a detail partially cross sectional side elevation view of the spear tip of FIG. 2 with two prongs removed for clarity, and further showing an end portion of a spear shaft.

DETAILED DESCRIPTION OF THE INVENTION

FIG. 1 illustrates a prior art paralyzer-type fishing spear tip 10. The spear tip 10 comprises three pointed spear prongs 12, 14, 16 having central longitudinal axes BB, CC, DD, respectively. Each spear prong comprises a pointed distal end 18 adapted for striking and penetrating a target and a proximal end 20 adapted for connection to a prong holder 22 portion of the spear tip. The prongs 12, 14, 16 are typically 12 inches long and 3/16 inch in diameter. The prong holder has a central longitudinal axis AA and includes an enlarged prong receiving portion 24 having a hexagonal cross section with a maximum diameter of about 0.75 inch and an integrally formed threaded adapter portion 26 having a diameter of about 0.5 inch. The spear prongs are mounted in three angled prong bores 28, 30 (only two shown). The central longitudinal axes of the spear prongs BB, CC, DD and the central longitudinal of the adapter AA intersect at a common point E. Each of the spear prong axes makes a substantially identical angle of intersection with the holder axis AA. This angle is approximately 15 degrees and provides a separation of approximately 1.5 inches between the three equally-spaced tip portions 18 of the prongs. Holding detents 32, 34, etc. are stamped into sidewall portions of the enlarged prong receiving portion 24 to hold the prongs in position within the associated prong bores 28, 30, etc. Typically six such detents are provided on the six sidewall faces of the holder.

The prior art prong holder 22 is constructed of steel. The provision of angled bores 28, 30, etc. and the provision of a hexagonal cross section and holding detents 32 and the provision of an integrally formed threaded adapter 26 represent a time consuming machining process which makes prior art paralyzer spear tips relatively expensive to produce. The steel adapter is also a relatively heavy component which adds undesirable weight at the end of the spear. In order to provide adequate space for the prong bores 28, 30, etc., the prong holder 22 must be provided with a relatively large frontal profile which is undesirable for aesthetic reasons and which also increases the fluid drag force on the spear tip.

FIG. 2 illustrates a fishing spear tip of the present invention. Spear tip 50 comprises three generally cylindrical spear prongs 52, 54, 56 having central longitudinal axes JJ, KK, LL, respectively. Each spear prong may comprise a length of approximately 11.75 inches and a diameter of approximately 3/16 inch and may be constructed from 900-H tempered 17-4 stainless steel. Each prong has a pointed distal end 58, adapted for striking and penetrating a target, and a proximal end 60 provided with a proximal end notch 62, FIG. 4, adapted for mounting in a prong holder 80. As best illustrated by FIG. 4, the prong holder 80 comprises a cylindrical outer surface 82 extending between a forward end 84 and a rear end 86 thereof. The prong holder also comprises a centrally positioned longitudinally extending threaded bore 88 extending forwardly from the rear end of the prong holder, and a larger centrally positioned longitudinally extending straight bore 90 extending rearwardly from the forward end of the prong holder. The straight bore 90 terminates at an annular end surface 92 and interfaces with the threaded bore 88. Prong holder 80 is preferably constructed of 6061T6 anodized aluminum and preferably has an outer diameter of 0.54 inch and a length of 1.5781 inches. Bore 90 is preferably 0.413 inches in diameter with a length of 1.0156 inches. Threaded bore 88 is preferably adapted to receive a ⅜ inch 16-course thread socket head set screw.

A threaded male adapter screw 94 which is preferably a ⅜ inch, 16-course thread, stainless steel, socket head set screw, has threads 96 thereon adapted to mate with the female thread groove of threaded bore 88. Threaded screw 94 has a first end 98 which, in a preferred embodiment of the invention, is positioned a short distance, e.g. 0.1 inches, forwardly of large bore annular end surface 92. The threaded screw comprises a second end portion 100 which is adapted to extend about 7/16 inch rearwardly of holder rear end 86 and to be threadingly received in a threaded bore portion 112 at the forward end of a conventional spear shaft 114 which is preferably an anodized aluminum spear shaft having the same diameter as prong holder 80. Bore 112 is preferably sufficiently deep to enable prong holder 80 to be positioned in abutting relationship with spear shaft 114. A firm setting matrix material 120 fills bore 90, holding prongs 52, 54, 56 (only prong 52 shown in FIG. 4) at a fixed position within the prong holder. In a preferred embodiment, the matrix material also penetrates threaded bore 88 somewhat, thereby fixedly holding male adapter screw 94 in fixed relationship therewithin.

As best illustrated in FIGS. 2 and 3, the central longitudinal axes JJ, KK, LL of the prongs do not intersect with one another nor with the central longitudinal axis HH of the prong holder. Rather, the prongs are arranged in a generally spiral configuration with a lower end surface 61 of each of the prongs in touching engagement with an upper end surface 99 of adapter screw 94, which provides a firm rear support for the prongs, and with the sidewall surface of each prong being in generally continuously touching contact with the inner sidewall surface of straight bore 90. It has been found that such a spiralling relationship is readily provided by human finger positioning of the three prongs' tips in spaced relationship before addition of matrix material to bore 90 or after addition of matrix material to bore 90, but before hardening thereof. When spear prongs of the diameter and length indicated above are used with a prong holder 80 having bore 90 of the length and diameter described above, it has been found that a substantially symmetrical, equal distance spear tip spacing of approximately 1.4 inches is provided "automatically" through finger urging of the spear tips into a spaced relationship, i.e. the spear tips assume this equally spaced relationship simply through the act of being urged outwardly, obviating the necessity of accurately measuring the angular relationship of the spear tip with the holder or the spacing between spear tips. Thus, the expense of accurately machining bores into a spear tip holder is eliminated. Further, the described attachment method enables the distal ends of the spear tips to be positioned closely together, thus providing a spear holder with a significantly smaller frontal profile than with prior art paralyzer-type spear tips such as illustrated in FIG. 1.

In a preferred embodiment of the invention, the spear tip holder 80 is constructed of anodized aluminum, a relatively porous material. It has been found that a mixture of resilient matrix material and hard-setting matrix material, which may be thermal setting plastic resins, provides a very stable spear tip configuration when used with prongs having notches such as 62 provided in the distal end and when used with an anodized aluminum holder. A notch such as shown at 62 in FIG. 4 stabilizes the associated spear prong both longitudinally and rotationally within the matrix. The use of a resilient matrix material in the matrix mixture enables penetration of the matrix material into the porous surface of the anodized aluminum, tending to lock the matrix into stable relationship with the holder 80. The provision of a hard-setting matrix material within the matrix mixture tends to provide strength to stabilize the spear prongs within the matrix material. In one preferred embodiment of the invention, the matrix material comprises a half and half mixture of Isoflex Polyester Resin, a flexible resin, and High Impact Resin, a hard setting resin, which is commercially available from Plastic Crafts Resin, 600 West Bayard, Denver, Colo. 80223.

Thus, it will be seen that the assembly of the present invention provides an extremely sturdy, inexpensive alternative to prior art paralyzer-type spear tips. Further, the spear tip assembly 50 of the present invention is lighter in weight and provides a smaller frontal profile holder which is less susceptible to fluid drag than the larger profile prong holders of the prior art. The present invention also provides a more aesthetically pleasing appearance than prior art paralyzer spear tips.

While a illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A fishing spear tip for mounting on a fishing spear shaft comprising:
    (a) a first spear prong having a first prong central longitudinal axis, and having a proximal end portion and having a pointed distal end adapted for penetrating a target;
    (b) a second spear prong substantially identical in construction to said first spear prong;
    (c) a third spear prong substantially identical in construction to said first spear prong;
    (d) a prong holder having a central longitudinal axis and having a forward end portion adapted to be positioned distal the spear shaft and a rear end portion adapted to be positioned proximal the spear shaft; said prong holder having a central longitudinally extending straight bore extending rearwardly from said forward end thereof and adapted to receive said proximal end portions of said first, second, and third prongs therein;
    (e) adapter means operatively associated with said prong holder for attaching said prong holder to a spear shaft;
    (f) matrix material positioned in said straight bore in said prong holder in fixed bonding relationship therewith and in fixedly holding, engaging contact with said proximal end portions of said first, second, and third prongs;
    (g) said central longitudinal axes of said first, second, and third prongs, and said central longitudinal axis of said prong holder all being positioned in nonparallel, nonintersecting relationship; terminal end portions of said distal end portions of said prongs being positioned in approximately equally spaced relationship and approximately equally distant from said central longitudinal axis of said prong holder and being substantially positioned in a plane perpendicular to said central longitudinal axis of said prong holder.

2. The invention of claim 1, each of said spear prongs comprising a notch in said proximal end portion thereof preventing longitudinal and rotational movement of said prong within said matrix material.

3. The invention of claim 1, said prong holder having a central longitudinally extending threaded bore, interfacing with said straight bore and extending rearwardly therefrom, said threaded bore having a smaller diameter than said straight bore, said straight bore terminating at a central opening at a terminal end of said forward end portion of said prong holder, said threaded bore terminating at a central opening at a terminal end of said rear end portion of said prong holder.

4. The invention of claim 3 said adapter means comprising a male adapter screw having threads thereon adapted to be screwingly received in said threaded bore of said prong holder.

5. The invention of claim 1 said first prong being generally cylindrical in shape and having a diameter of approximately 3/16 inch and having a length of approximately 11.8 inches; said prong holder being generally cylindrical in shape and having a diameter of approximately 0.5 inch and a length of approximately 1.6 inches; said straight bore having a length of approximately 1.0 inch and a diameter of approximately 0.4 inch.

6. The invention of claim 1 wherein said prong holder is constructed of anodized aluminum, said matrix material comprising a mixture of hard-setting matrix material and flexible matrix material adapted to bond to said anodized aluminum.

7. A fishing spear tip for mounting on a fishing spear shaft comprising:

a first spear prong having a first prong central longitudinal axis, and having a proximal end portion having a notch therein adapted to prevent longitudinal or rotational movement of said first prong within a surrounding matrix, and having a pointed distal end adapted for penetrating a target, said first prong being generally cylindrical in shape and having a diameter of approximately 3/16 inch and having a length of approximately 11.8 inches;

a second spear prong substantially identical in construction to said first spear prong;

a third spear prong substantially identical in construction to said first spear prong;

a prong holder having a central longitudinal axis and having a forward end portion adapted to be positioned distal the spear shaft and a rear end portion adapted to be positioned proximal the spear shaft; said prong holder having a central longitudinally extending straight bore extending rearwardly from said forward end thereof and adapted to receive said proximal end portions of said first, second, and third prongs therein; said prong holder having an adapter portion adapted to be attached to a spear shaft bore, interfacing with said straight bore and extending rearwardly therefrom; said straight bore having a length of approximately 1.0 inch and a diameter of approximately 0.4 inch;

matrix material positioned in said straight bore in said prong holder in fixed bonding relationship therewith and in fixedly holding, engaging contact with said proximal end portions of said first, second, and third prongs;

said first, second, and third prongs being positioned with cylindrical sidewall surfaces thereof in engaging contact with sidewall portion of said prong holder straight bore; said central longitudinal axes of said first, second, and third prongs, and said central longitudinal axis of said prong holder all being positioned in nonparallel, nonintersecting relationship; terminal end portions of said distal end portions of said prongs being positioned in approximately equally spaced relationship and approximately equally distant from said central longitudinal axis of said prong holder and being substantially positioned in a plane perpendicular to said central longitudinal axis of said prong holder.

8. A fishing spear tip for mounting on a fishing spear shaft comprising:

a first spear prong having a first prong central longitudinal axis, and having a proximal end portion having a notch therein adapted to prevent longitudinal or rotational movement of said first prong within a surrounding matrix, and having a pointed distal end adapted for penetrating a target, said first prong being generally cylindrical in shape and having a diameter of approximately 3/16 inch and having a length of approximately 11.8 inches;

a second spear prong substantially identical in construction to said first spear prong;

a third spear prong substantially identical in construction to said first spear prong;

a prong holder having a central longitudinal axis and having a forward end portion adapted to be positioned distal the spear shaft and a rear end portion adapted to be positioned proximal the spear shaft; said prong holder having a central longitudinally extending straight bore extending rearwardly from said forward end thereof and adapted to receive said proximal end portions of said first, second, and third prongs therein; said prong holder having a central longitudinally extending threaded bore, interfacing with said straight bore and extending rearwardly therefrom, said threaded bore having a smaller diameter than said straight bore, said straight bore terminating at a central opening at a terminal end of said forward end portion of said prong holder, said threaded bore terminating at a central opening at a terminal end of said rear end portion of said prong holder; said prong holder being generally cylindrical in shape and having a diameter of approximately 0.5 inch and a length of approximately 1.6 inches; said straight bore having a length of approximately 1.0 inch and a diameter of approximately 0.4 inch; said threaded bore having a diameter of approximately ⅜ inch; said prong holder being constructed from anodized aluminum;

a male adapter screw having threads thereon adapted to be screwingly received in said threaded bore of said prong holder; said male adapter screw having a length of approximately 1.0 inch; said male adapter being screwingly received in said said threaded bore at a position whereat a forward portion of said male adapter screw projects approximately 1.0 inch into said straight bore;

matrix material positioned in said straight bore in said prong holder in fixed bonding relationship therewith and in fixedly holding, engaging contact with said proximal end portions of said first, second, and third prongs and said forwardly projecting portion of said male adapter screw; said matrix material comprising a mixture of hard-setting matrix material and flexible matrix material;

said first, second, and third prongs being positioned with terminal end portions of said proximal end portions thereof in engaging contact with said male adapter screw and with cylindrical sidewall surfaces thereof in engaging contact with a sidewall portion of said prong holder straight bore; said central longitudinal axes of said first, second, and third prongs, and said central longitudinal axis of said prong holder all being positioned in nonparallel, nonintersecting relationship; terminal end portions of said distal end portions of said prongs being positioned in approximately equally spaced relationship and approximately equally distant from said central longitudinal axis of said prong holder and being substantially positioned in a plane perpendicular to said central longitudinal axis of said prong holder;

said rear end portion of said male adapter screw being adapted to be screwingly received in a female adapter portion provided at a forward end of a spear shaft.

9. A method of making a paralyzer spear tip comprising the steps of:

(a) providing a first spear prong having a first prong central longitudinal axis, and having a proximal end portion and having a pointed distal end adapted for penetrating a target; a second spear prong substantially identical in construction to said first spear prong; a third spear prong substantially identical in construction to said first spear prong; a prong holder having a central longitudinal axis and having a forward end portion adapted to be positioned distal the spear shaft and a rear end portion adapted to be positioned proximal the spear shaft; said prong holder having a central longitudinally extending straight bore extending rearwardly from said forward end thereof and adapted to receive said proximal end portions of said first, second, and third prongs therein;

(b) positioning the prong holder in a vertical orientation with the straight bore opening positioned upwardly;

(c) filling the straight bore in the prong holder with a relatively firm setting matrix material;

(d) positioning the proximal ends of said first, second, and third spear prongs in said prong holder straight bore;

(e) simultaneously urging the distal tips of the three prongs outwardly with approximately equal force.

* * * * *